United States Patent
Bostick et al.

(10) Patent No.: US 9,607,216 B2
(45) Date of Patent: Mar. 28, 2017

(54) IDENTIFYING UPDATED CONTENT IN IMAGES

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 14/672,441

(22) Filed: Mar. 30, 2015

(65) Prior Publication Data

US 2016/0292502 A1 Oct. 6, 2016

(51) Int. Cl.
*G06K 9/00* (2006.01)
*G06K 9/62* (2006.01)

(52) U.S. Cl.
CPC ....... *G06K 9/00442* (2013.01); *G06K 9/6202* (2013.01)

(58) Field of Classification Search
CPC ....... G06F 17/30572; G06F 2221/2111; G06K 9/00624
See application file for complete search history.

(56) References Cited

U.S. PATENT DOCUMENTS

| | | | |
|---|---|---|---|
| 8,391,617 B2 | 3/2013 | Yu et al. | |
| 8,411,953 B2 | 4/2013 | Deluca et al. | |
| 2003/0033296 A1 | 2/2003 | Rothmuller et al. | |
| 2007/0271226 A1* | 11/2007 | Zhang | G06F 17/30265 |
| 2008/0168135 A1* | 7/2008 | Redlich | G06Q 10/10 709/204 |
| 2008/0319990 A1* | 12/2008 | Taranenko | G06F 17/30241 |
| 2009/0217149 A1 | 8/2009 | Kamien et al. | |

(Continued)

OTHER PUBLICATIONS

IBM, "System and method to enrich images with semantic data"; An IP.com Prior Art Database Technical Disclosure; IP.com No. 000156659; Jul. 30, 2007.

(Continued)

*Primary Examiner* — Vu Le
*Assistant Examiner* — Guillermo Rivera-Martinez
(74) *Attorney, Agent, or Firm* — Daniel R. Simek

(57) ABSTRACT

Aspects of the present invention disclose a method, computer program product, and system for analyzing an image. The method includes one or more processors identifying a document that includes (i) at least one image and (ii) unstructured text that is situated proximate to the image, wherein both the image and the unstructured text are concurrently displayed in the document. The method further includes identifying one or more potential locations depicted in the image included in the identified document, based on an analysis of the unstructured text that is situated proximate to the image. The method further includes identifying a set of images of a first potential location from the identified one or more potential locations. The method further includes determining whether an image in the set of images of the first potential location substantially matches the image included in the identified document.

20 Claims, 6 Drawing Sheets

(56) References Cited

U.S. PATENT DOCUMENTS

| | | | |
|---|---|---|---|
| 2013/0304871 A1 | 11/2013 | Silverman | |
| 2014/0079297 A1* | 3/2014 | Tadayon | G06K 9/00 |
| | | | 382/118 |
| 2014/0201126 A1* | 7/2014 | Zadeh | G06K 9/627 |
| | | | 706/52 |

OTHER PUBLICATIONS

"Automatic Recommendations of Images and Videos to Delete"; An IP.com Prior Art Database Technical Disclosure; IP.com No. 000239057; Oct. 6, 2014.

"Park Circus | Quest (Spencers Galleria) | Mall | Completed"; SkyscraperCity; Printed Dec. 29, 2014; ordinary issue 23; <http://www.skyscrapercity.com/showthread.php?s=979c15b0f6565edc45aecdb720a231a0&t=1469454>.

"Reverse image search", Copyright 2015 Google, printed Feb. 24, 2015, <https://support.google.com/websearch/answer/1325808?hl=en>.

* cited by examiner

310 — 
Shopping In The City

The City is home to quite a number of malls in the present day. But it was 22 Main Street that pioneered the concept of modern day malls in 2000. However, it was the South City Mall, in 2008, that revolutionized the concept of "lifestyle destination mall." Malls like the New Town City Center along with several others have carried on the footprint.

Come 2013 and the Shopping Gallery is all set to reform & reinvent the concept of a lifestyle destination mall in a big way.

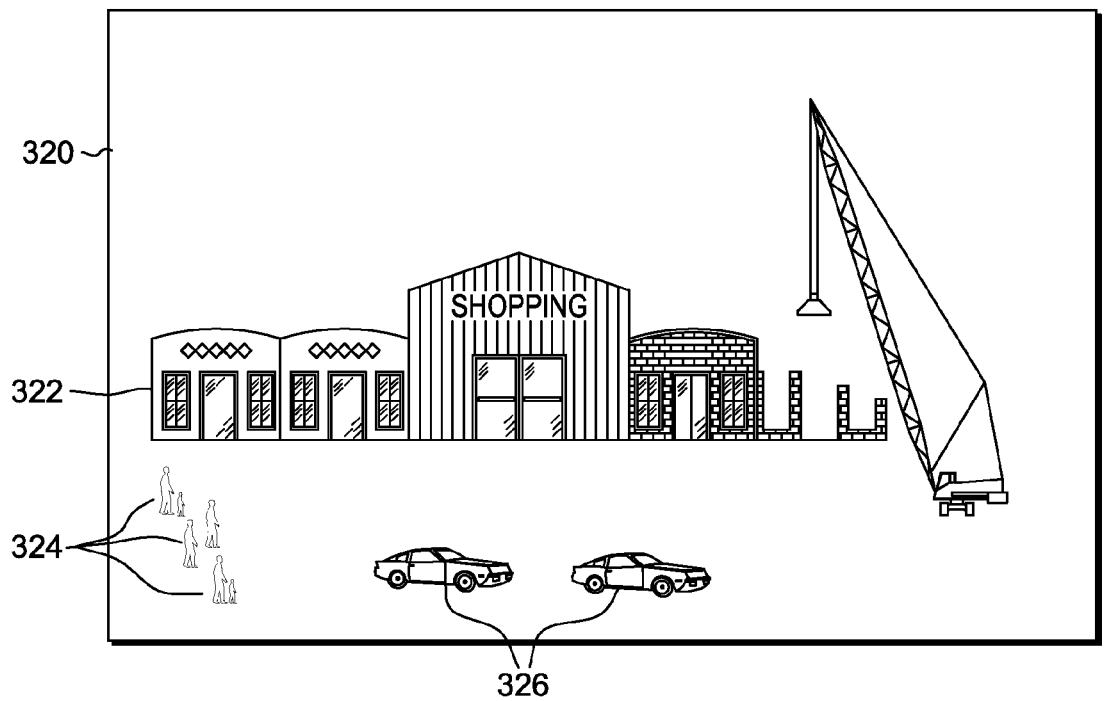

FIG. 3A

| Potential Image Location | Confidence Level |
|---|---|
| Shopping Gallery | 34% |
| New Town City Center | 9% |
| South City Mall | 6% |
| 22 Main Street | 4% |
| The City | 2% |

IDENTIFYING UPDATED CONTENT IN IMAGES

BACKGROUND OF THE INVENTION

The present invention relates generally to the field of data analysis, and more particularly to identifying updated content in images.

Within the World Wide Web (WWW) and the Internet, users can upload different images and incorporate the images into documents. The images may represent the current state of the image at the time of upload. For example, an individual can upload an image of a city skyline to a web document (e.g., a web site, a blog entry, a wiki, a web application, an article, etc.), and the city skyline includes some buildings that are currently under construction. These uploaded images can include corresponding metadata.

Metadata is "data about data" and includes two different types of metadata, structural metadata, and descriptive metadata. Structural metadata includes information about the design and specification of data structures (i.e., data about the containers of data). Descriptive metadata includes information about individual instances of application data or the data content. Metadata can be written into a digital image file to indicate various types of information that is associated with the image, such as who owns the image, copyright and contact information, what camera created the image file, along with exposure information and descriptive information, such as keywords associated with the image. Images that include metadata can be more easily searchable (e.g., via the Internet). Metadata also helps organize electronic resources, provides digital identification, and helps support archiving and preservation of a resource. Metadata also assists in resource discovery by allowing resources to be found (e.g., via Internet searching) by relevant criteria, identifying resources, associating similar resources, and giving location information.

SUMMARY

Aspects of the present invention disclose a method, computer program product, and system for analyzing an image. The method includes one or more processors identifying a document that includes (i) at least one image and (ii) unstructured text that is situated proximate to the image, wherein both the image and the unstructured text are concurrently displayed in the document. The method further includes one or more processors identifying one or more potential locations depicted in the image included in the identified document, based on an analysis of the unstructured text that is situated proximate to the image. The method further includes one or more processors identifying a set of images of a first potential location from the identified one or more potential locations. The method further includes one or more processors determining whether an image in the set of images of the first potential location substantially matches the image included in the identified document.

BRIEF DESCRIPTION OF THE DRAWINGS

FIG. 3A depicts an example of a document that includes an image and a portion of text that is associated with the image, in accordance with an embodiment of the present invention.

DETAILED DESCRIPTION

Embodiments of the present invention allow for a user to view an updated version of the content of an image. A document that includes an image is identified, and the text of the document is analyzed to identify potential locations depicted in the image. The image in the document is compared to images of the identified potential locations. When a match is found, a thumbnail of a matching location is displayed to the user.

Some embodiments of the present invention recognize that users upload images that can represent the current state of an object at the time of upload. Over a period of time, the uploaded images can become out of date in terms of representing the current state of objects in the images. For example, a user can search for pictures of a city skyline, and the search results that are returned can vary across a wide range of time (e.g., building in the skyline in various stages of construction, etc.). When the user is viewing the search results, the user may not be able to know which images are current and which images are out of date.

Implementation of embodiments of the invention may take a variety of forms, and exemplary implementation details are discussed subsequently with reference to the Figures.

Figure 1:
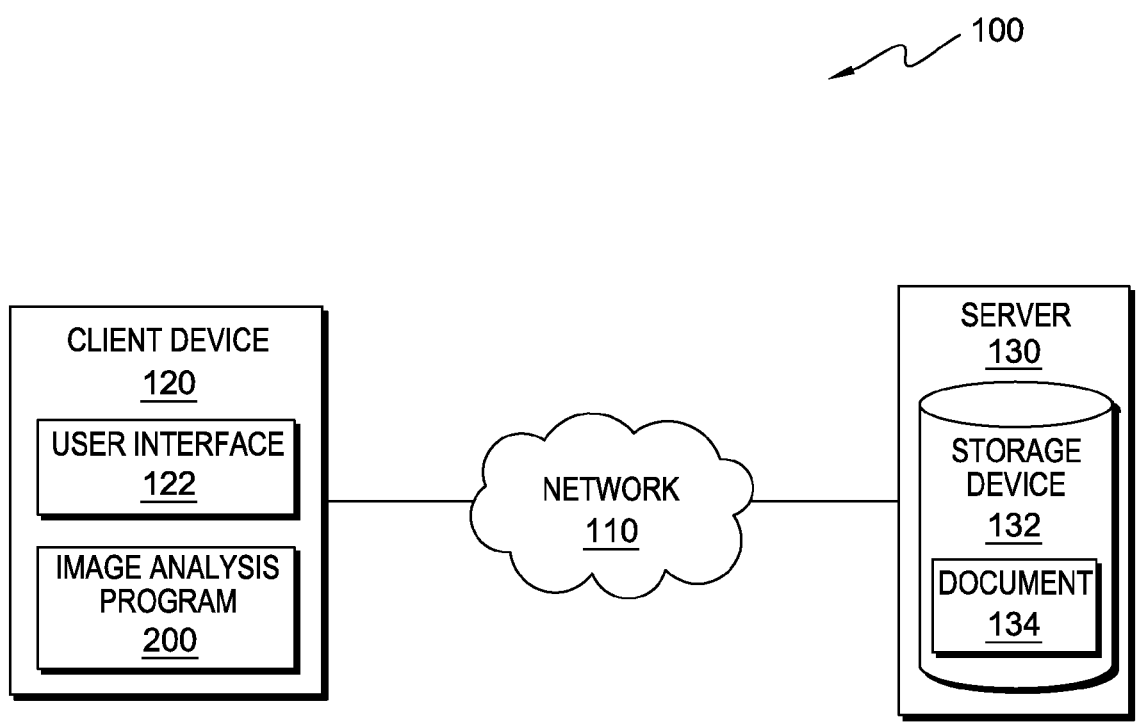
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 120 and server 130, interconnected over network 110. In an example embodiment, client device 120 accesses data that is hosted on server 130. In one embodiment, client device 120 and server 130 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols that will support communications between client device 120 and server 130, in accordance with embodiments of the present invention.

In various embodiments of the present invention, client device 120 may be a workstation, personal computer, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 4, in accordance with embodiments of the present invention.

Client device 120 includes user interface 122 and image analysis program 200. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API). Image analysis program 200 analyzes an image to identify updated versions of content in the image that are included in other images, in accordance with embodiments of the present invention. For example, image analysis program 200 can identify other images that are accessible via network 110, such as images located on other servers (not shown).

In example embodiments, server 130 can be a desktop computer, a computer server, or any other computer systems, known in the art. In certain embodiments, server 130 represents computer systems utilizing clustered computers and components (e.g., database server computers, application server computers, etc.) that act as a single pool of seamless resources when accessed by elements of data processing environment 100 (e.g., client device 120). In general, server 130 is representative of any electronic device or combination of electronic devices capable of executing computer readable program instructions. Server 130 may include components as depicted and described in further detail with respect to FIG. 4, in accordance with embodiments of the present invention.

Server 130 includes storage device 132, which includes document 134. Storage device 132 can be implemented with any type of storage device, for example, persistent storage 405, which is capable of storing data that may be accessed and utilized by server 130 and client device 120, such as a database server, a hard disk drive, or a flash memory. In other embodiments, storage device 132 can represent multiple storage devices within server 130. Storage device 132 stores a plurality of documents, such as document 134. Document 134 is a web document that includes at least one imbedded image. For example, document 134 can be a web site, a blog entry, a wiki, a web application, an article, etc. In additional embodiments, document 134 can include or be associated with metadata. In one embodiment, document 134 includes metadata but is missing metadata that indicated a data and location of at least one image in document 134. In additional embodiments, data processing environment 100 can include additional servers (not shown) that host additional documents and images that are accessible to client device 120 via network 110.

Figure 2:
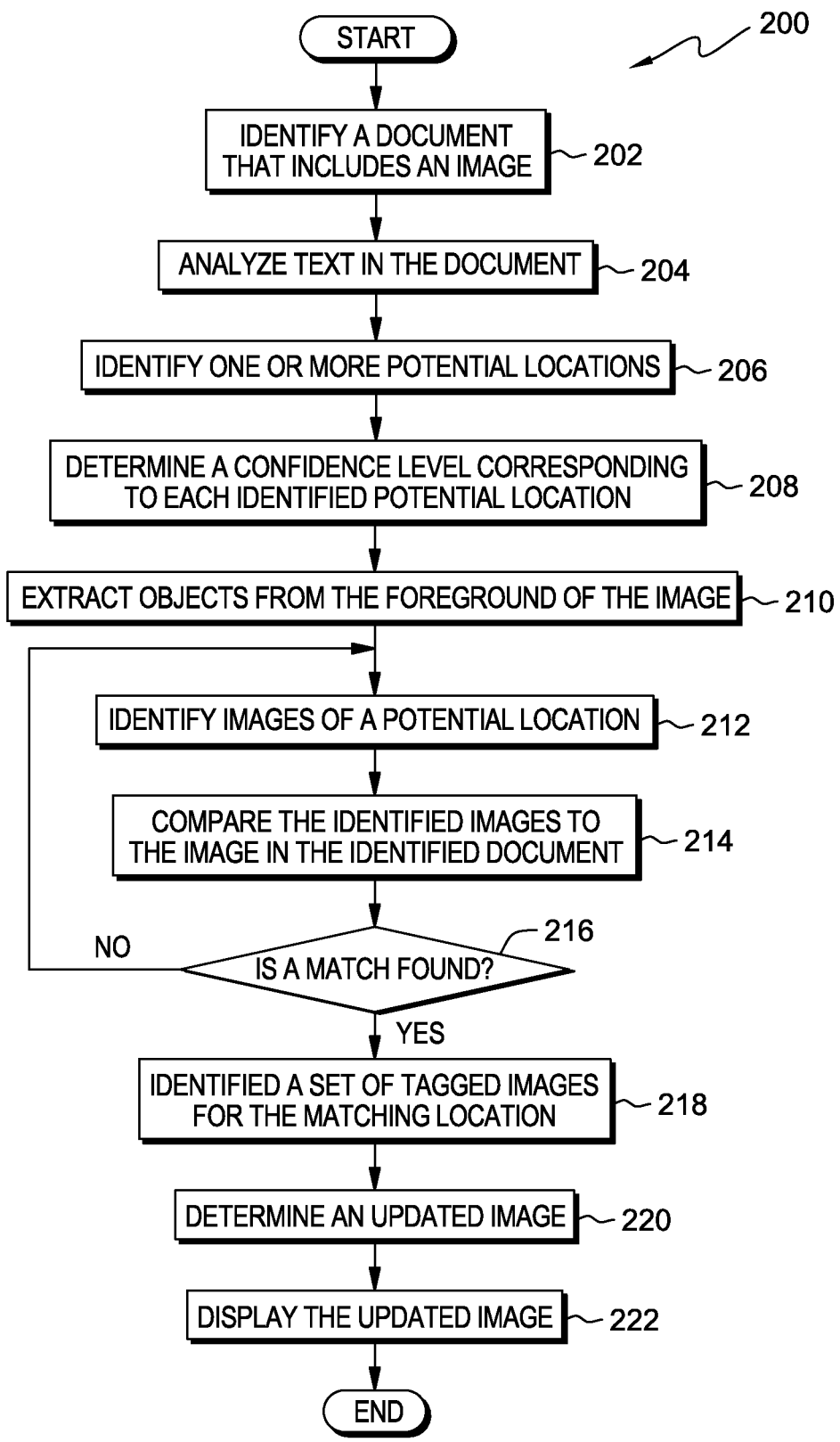
FIG. 2 is a flowchart depicting operational steps of a program for analyzing an image to identify updated versions of content in the image that are included in other images, in accordance with an embodiment of the present invention.

FIG. 2 is a flowchart depicting operational steps of image analysis program 200, a program for analyzing an image to identify updated versions of content in the image that are included in other images, in accordance with embodiments of the present invention.

In step 202, image analysis program 200 identifies a document that includes an image. In one embodiment, image analysis program 200 identifies document 134, which is stored on storage device 132 of server 130. In another embodiment, image analysis program 200 identifies a document that is stored on client device 120. In an additional embodiment, image analysis program 200 can receive a document via network 110 (e.g., document 134 from server 130). The identified document, for example document 134, can be a web document (e.g., a web site, a blog entry, a wiki, a web application, an article, etc.) that includes text and at least one image. Images that are included in the identified document can be tagged with corresponding instances of metadata, which provide information relating to the images. In one aspect, the identified document includes an image that is not tagged with metadata or not tagged with a complete set of metadata. For example, an image in document 134 is not tagged with metadata that indicates the location depicted in the image or the data that the image was taken.

FIG. 3A depicts sample document 300, which is an example illustration of a document that image analysis program 200 identifies in step 202. Sample document 300 includes text 310 and image 320. Text 310 is a text description, within sample document 300, which describes image 320. Image 320 depicts building 322, people 324, and cars 326. In this example, building 322 is under construction and partially completed, while people 324 and vehicles 326 are also depicted in image 320.

In step 204, image analysis program 200 analyzes text in the document. In one embodiment, image analysis program 200 analyzes the text in the identified document (identified in step 202) that is proximate to the image in the identified document (e.g., a document heading, an image caption, or other text included in a document). In an example embodiment, image analysis program 200 collects the text in document 134 as metadata and analyzes the text utilizing Natural Language Processing (NLP). For example, image analysis program 200 utilizes NLP deep parsing (e.g., deep linguistic processing) to identify information associated with the context and location of the image in the identified document.

In an example, image analysis program 200 utilizes NLP deep parsing to analyze text 310 of sample document 300. Text 310 is the text portion of sample document 300 that is proximate to image 320 (i.e., the image in the document). Image analysis program 200 utilizes NLP deep parsing to analyze text 310 and identify information associated with a likely location depicted in image 320. Image analysis program 200 identifies names of potential locations in text 310 that include: "The City," "22 Main Street," "South City Mall," "New Town City Center," and "Shopping Gallery."

In an example scenario, image analysis program 200 analyzes text displayed in the document that is associated with an image included in a document (e.g., text 310 in sample document 300) to identify text in the document that is indicative of names of locations and distances of said text in the document that is indicative of names of locations from the image. Text 310 is an unstructured text description (i.e., not metadata text) that is concurrently displayed with image 320 in sample document 300 and situated proximate to image 320. For example, sample document 300 is an article that includes (e.g., concurrently displays to a user) image 320 and a text description in text 310 that is associated with image 320 and displayed to a user concurrently with image 320. The text description in text 310 is unstructured text that is associated with image 320 and displayed to a user concurrently with image 320, therefore text 310 is not metadata that is stored in association with image 320. Additionally, the text description, such as text 310 is situated in sample document 300 in a location that is proximate to image 320. Image analysis program 200 identifies and analyzes the unstructured test description (i.e., text 310) that is associated with image 320 (in step 204).

In step 206, image analysis program 200 identifies one or more potential locations. In one embodiment, image analysis program 200 identifies one more potential locations that may be depicted in the identified document (identified in step 202), based on information identified in the analysis of the document (step 204). In the previously discussed example, image analysis program 200 identifies names of potential locations that include: "The City," "22 Main Street," "South City Mall," "New Town City Center," and "Shopping Gallery." In an additional embodiment, image analysis program 200 utilizes context information from the analysis of the text in the document. For example, image analysis program 200 utilizes location context to identify a location associated with "22 Main Street" (e.g., 22 Main Street in proximity to "The City" discussed in text 310, or other locations that are identified in text 310, etc.).

In step 208, image analysis program 200 determines a confidence level corresponding to each identified potential location. In one embodiment, image analysis program 200 determines and assigns a confidence level (e.g., a percentage, or other form of confidence value) for each of the one or more identified potential locations (from step 206) indicating a likelihood that the identified potential location is represented in the image in the identified document. Image analysis program 200 utilizes information gathered in the NLP deep parsing analysis of step 204 to determine confidence levels. In various embodiments, image analysis program 200 utilizes factors that include text proximity (e.g., location of text in relation to the image in the document), text description (e.g., location of text in relation to the context of the description in the document), and text frequency (e.g., number of instances that certain text, such as location names and references, occur in the document).

In one example for text proximity, image analysis program 200 associates a high confidence level with the potential location in the text that appears closest to the image. For example, "Shopping Gallery" in text 310 appears closest to image 320. In another example for text description, image analysis program 200 associates a high confidence level with the potential location mentioned in a conclusion portion of the document. For example, sample document 300 discusses a series of shopping malls with "Shopping Gallery" being included in the conclusion portion of text 310. In an additional example for text frequency, image analysis program 200 associates a high confidence level with the potential location in the text that is mentioned most frequently. For example, sample document 300 mentions each potential location once in text 310, therefore image analysis program 200 can consider text frequency to be substantially similar for each potential location.

Figure 3B:
FIG. 3B depicts an example of a table that includes potential image locations and corresponding confidence levels, in accordance with an embodiment of the present invention.

FIG. 3B depicts table 330, which is an example of a table that includes information regarding the confidence levels determined in step 208. Table 330 includes a row corresponding to each of the identified one or more potential locations (from step 206) and two columns indicating the potential image locations and the determined confidence level. The "Shopping Gallery" is the potential image location with the highest determined confidence level (34%).

In another example embodiment, image analysis program 200 determines confidence levels by ranking the one or more identified potential locations. For example, image analysis program 200 can determine a ranking based on the text proximity of potential image locations. In this example, image analysis program 200 determines the ranking (from highest confidence level to lowest) to be: "Shopping Gallery," "New Town City Center," "South City Mall," "22 Main Street," and "The City." In additional embodiments, image analysis program 200 can utilize the text proximity to determine an initial ranking, then image analysis program 200 can utilize other factors (e.g., the text description) to modify or update the initial ranking.

Further, the NLP parsing does not need the actual location name of the image to be included in the text. For example, a web page is titled, "Things to do in Paris" and contains a discussion of the Mona Lisa and a reference to "one of the largest museums in the world." Image analysis program 200 can utilize NLP parsing and searching to determine that the information in the web page is indicating The Lourve in Paris; and therefore, image analysis program 200 associates a high confidence level with The Lourve.

In another embodiment, image analysis program 200 compares names of potential locations utilizing NLP as a component of determining a confidence level. For example, a selection of text associated with a picture of a mall includes potential location names of "Shopping Mall," "Shop Corp Mall," and "The City." Image analysis program 200 can make an association between "Shopping Mall" and "Shop Corp Mall" based on both names including "Mall," and image analysis program 200 cannot make that association to "The City" (since the location does not include the word "mall"). Image analysis program 200 then determines confidence levels for "Shopping Mall" and "Shop Corp Mall" that are higher than the confidence level for "The City." In an additional embodiment, image analysis program 200 utilizes NLP with a domain dictionary (e.g., on client device 120), which indicates that "Shop Corp" is a corporation. Image analysis program 200 can use the information of "Shop Corp" being a corporation to determine a more accurate confidence rating for "Shop Corp Mall" (e.g., referencing "Shop Corp" with images, documents, and associated metadata, etc.).

In step 210, image analysis program 200 extracts objects from the foreground of the image. In one embodiment, image analysis program 200 utilizes object recognition software to identify objects in the foreground of the image in the document that are not a characteristic of a location, such as people and vehicles. Image analysis program 200 removes the identified objects from the foreground of the image, which results in an image of the location that image analysis program 200 can utilize for comparisons. In other embodiments, image analysis program 200 can identify objects that are in the background of an image, as well as the foreground of an image, that are not a characteristic of a location.

In an example embodiment, image analysis program 200 extracts objects from the foreground of image 320 of sample document 300. Image analysis program 200 identifies people 324 and cars 326 in image 320 utilizing object recognition software (e.g., software on client device 120, not shown) as objects in the foreground of image 320 (e.g., not a characteristic of the location, such as building 322). Image analysis program 200 removes the identified objects that include people 324 and cars 326 from image 320, which results in an image with a reduced amount of extra objects.

In step 212, image analysis program 200 identifies images of a potential location. In one embodiment, image analysis program 200 identifies images that correspond to one of the identified one or more potential locations. In an example embodiment, on the first iteration, image analysis program 200 identifies at least one image that corresponds to the identified potential location with the highest associated confidence level (determined in step 208). Then on subsequent iterations, image analysis program 200 identifies at least one image that corresponds to the identified potential location with the next highest confidence level. Image analysis program 200 searches for images that are accessible via network 110. For example, image analysis program 200 searches for images that are hosted on one or more image repositories (not shown). Image analysis program 200 identifies images that are tagged with metadata that indicates the potential location that image analysis program 200 is searching for.

In the previously discussed example regarding sample document 300, image analysis program 200 initially identifies images of the potential location with the highest determined confidence level, which is the "Shopping Gallery" (with a 34% confidence level as depicted in table 330). In this example, image analysis program 200 accesses a plurality of image repositories (not shown) utilizing network 110 to search for images that are tagged with metadata that indicates the "Shopping Gallery" location. Image analysis program 200 identifies at least one image of the "Shopping Gallery" (based on tagged metadata of the images). In example embodiments, the number of images that image analysis program 200 identifies can be based on user input or preferences (e.g., identifies a maximum of 10 images, identifies all images in a certain repository, identifies images based on another metadata characteristic, etc.). In another embodiment, image analysis program 200 identifies a set of images, which, if image analysis program 200 cannot find an image with appropriate tagged metadata, is a set that includes zero images (i.e., an empty set).

In step 214, image analysis program 200 compares the identified images to the image in the identified document. In one embodiment, image analysis program 200 compares the identified images (from step 212) to the image included in the identified document (from step 202). In another embodiment, image analysis program 200 extracts objects from the foreground and background of the identified images utilizing the process discussed in step 210 (e.g., utilizing object recognition software). Image analysis program 200 compares the identified images of the potential location, with objects extracted from the images, to the image included in the identified document, that also has objects extracted from the image (in step 210). In additional embodiments, image analysis program 200 utilizes metadata associated with images in the comparison, since modifications can occur to locations over time, such as building construction, etc.

In various embodiments, image analysis program 200 utilizes image comparison software to compare each of the identified images of the potential location to the image included in the document and determines a similarity between the given images. For example, image analysis program 200 utilizes reverse image searching techniques to compare images and identify similarities between images (e.g., a similarity rating, percentage of similar features, etc.). In an example, image analysis program 200 compares each of the identified images of the "Shopping Center" to building 322 in image 320 (e.g., not including people 324 and cars 326).

In decision step 216, image analysis program 200 determines whether a match is found. In one embodiment, image analysis program 200 determines whether one of the identified images of the potential location matches the location depicted in the image included in the identified image. In various embodiments, locations depicted in images are matching if image analysis program 200 utilizes image comparison software (e.g., reverse image searching techniques) to determine that the locations depicted in the images are substantially matching, such as within a threshold of similarity, certain matching features, etc.

If image analysis program 200 determines that none of the identified images of the potential location match the location depicted in the image included in the identified document (decision step 216, no branch), then image analysis program 200 returns to step 212 to identify images of the potential location with the next highest confidence level. For example, if image analysis program 200 determines that none of the identified images of the "Shopping Gallery" are a match for building 322 in image 320, then image analysis program 200 returns to step 212 to identify images of "New Town City Center" (i.e., the second highest confidence level depicted in FIG. 3B). In another embodiment, image analysis program 200 performs a comparison (in step 214) of each identified image of the potential location up to a threshold number of images (e.g., the first ten images returned in the search, etc.).

In step 218, image analysis program 200 identifies a set of tagged images for the matching location. More specifically, responsive to determining that at least one of the identified images of the potential location does match the location depicted in the identified document (decision step 216, yes branch), image analysis program 200 identifies a set of tagged images for the matching location. In various embodiments, image analysis program 200 searches for and finds images that are tagged with metadata that indicates the location depicted in the determined matching image (e.g., utilizing techniques previously discussed in step 206). Image analysis program 200 identifies a set of images that includes metadata indications of the location depicted in the images, as well as additional metadata that can provide additional information that pertains to the image included in the identified document (e.g., the data the image was taken, the direction from which the image was captured, etc.).

Figure 3C:
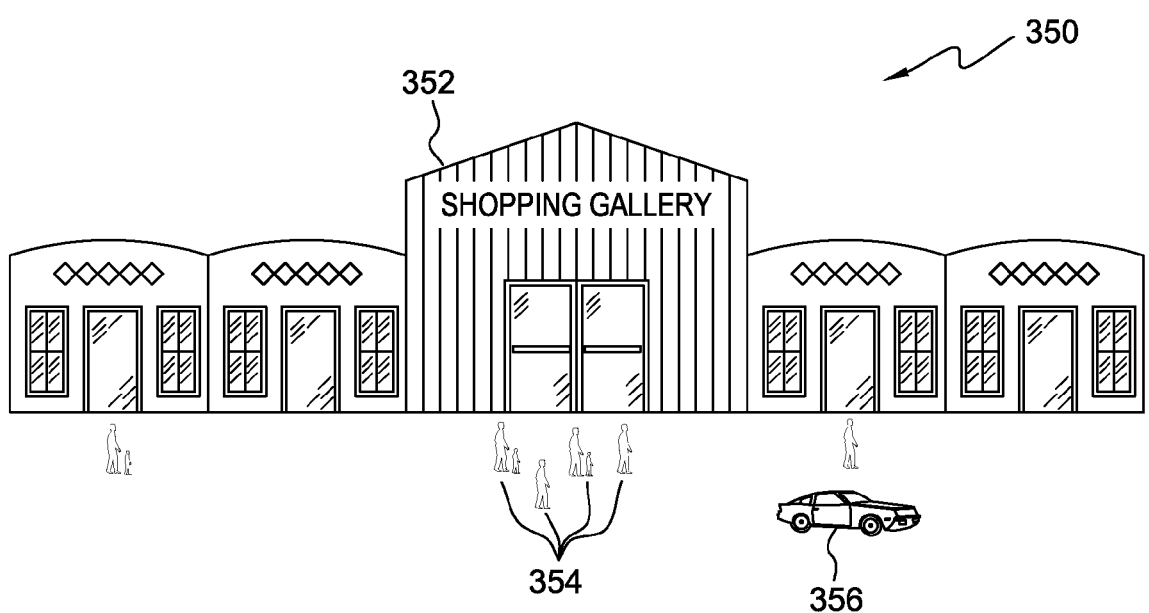
FIG. 3C depicts an example of an image that includes an updated version of the content depicted in FIG. 3A, in accordance with an embodiment of the present invention.

In an example embodiment, image analysis program 200 identifies a set of tagged images for a matching location that includes image 350 (depicted in FIG. 3C). Image 350 includes building 352, people 354, and car 356. Building 352 in image 350 is a completed version of building 322 in image 320, which depicted building 322 while under construction. People 354 and car 356 are objects that are in the foreground of image 350, which image analysis program 200 can extract (using object recognition software) for the purpose of comparing the images. In this example, image analysis program 200 determined (in step 216) that an image that was tagged with metadata that indicated a location of the "Shopping Gallery" matched image 320 of sample document 300 (e.g., both images depicting the "Shopping Gallery" while under construction). Then, image analysis program 200 identifies (in step 218) a set of images that are tagged with metadata and are images of the "Shopping Gallery" (e.g., at various dates and in various forms of construction).

In step 220, image analysis program 200 determines an updated image. In one embodiment, image analysis program 200 determines an updated image from the identified set of tagged images (from step 218). Image analysis program 200 can determine an updated image based on different user references and defined characteristics. For example, image analysis program 200 can determine the updated image to be the image in the identified set of images that is tagged with metadata that indicates the most recent date. In another example, image analysis program 200 can determined the updated image to be the image in the identified set of images that is tagged with metadata that the image is the most recent image that was captured from a similar angle to the image included in the identified document. In additional examples, image analysis program 200 can utilize other ranking characteristics to determine the updated image, such as quality of an image (e.g., image resolution), social media sentiment for an image (e.g., ratings and other data provide by social media users), rankings associated with an image, etc.

In another embodiment, image analysis program 200 can utilize images in the set of identified tagged images (from step 218) to determine information that is associated with the image included in the identified document (e.g., the source image and document from step 202). For example, image analysis program 200 can utilize metadata to determine information associated with the image included in the identified document including the date the image was taken and the direction in which an image was captured. To determine the date an image was captured, image analysis program 200 can utilize metadata associated with the identified set of tagged images, a level of construction in an image, visible signage in the images (e.g., a sign indicating the year 2009), and other identification characteristics. To determine the direction in which an image was captured, image analysis program 200 can utilize metadata associated with the identified set of tagged images (e.g., metadata indicating that the image is facing north), visible signage in the images, and other identification characteristics.

In an example embodiment, image analysis program 200 determines that image 350 (of FIG. 3C) meets pre-defined user preferences and is the updated image of the image included in the identified document (i.e., image 320 in sample document 300). For example, image 350 is tagged with metadata that indicated that image 350 was taken at the most recent date (compared to the other images in the identified set of tagged images), which meets a user preference of the most recent image.

In step 222, image analysis program 200 displays the updated image. In one embodiment, image analysis program 200 displays the determined updated image (from step 220) to the user of client device 120 via user interface 122. In an example, image analysis program 200 displays the updated image as a thumbnail with the image included in the identified document (e.g., overlaying a top corner portion of the source image). An individual utilizing client device 120 can select the image thumbnail (e.g., via user interface 122), which results in image analysis program 200 displaying a full version of the update image to the individual (e.g., displaying image 350). In an additional embodiment, image analysis program 200 can also display additional information that pertains to the source image (i.e., the image include in the identified document), such as the date the image was taken and the direction in which an image was captured, etc. In one aspect, image analysis program 200 displays a thumbnail image that is an up-to-date image of the source image.

In an example embodiment, image analysis program 200 can initiate in response to a user of client device 120 accessing and viewing an image (e.g., in a document). Image analysis program 200 can provide the user with a more up-to-date version of the image that the user is viewing. For example, image analysis program 200 can operate in the background of client device 120 (e.g., as an application or plug-in associated with a web browser, etc.) without a request to initiate and operate from the user of client device 120. In one scenario, a user is viewing images of an apartment building. Image analysis program 200 operates in the background of client device 120 to determine an updated image that depicts the apartment building in the present time (e.g., including updated features that are not depicted in a past image, etc.).

Figure 4:
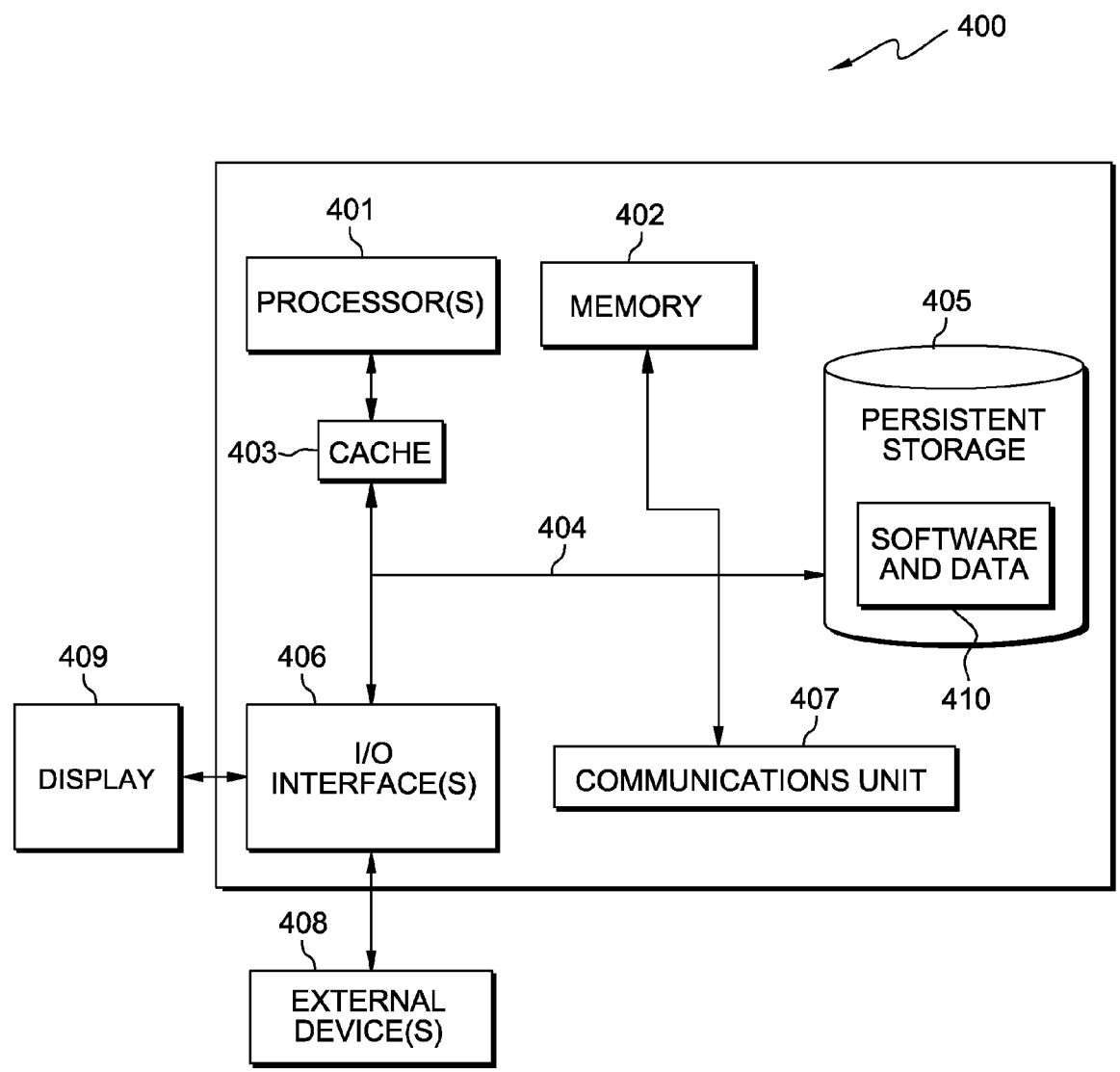
FIG. 4 depicts a block diagram of components of a computing system representative of the client device and server of FIG. 1, in accordance with an embodiment of the present invention.

FIG. 4 depicts computer system 400, which is representative of client device 120 and server 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processors 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processors 401 via cache 403. With respect to client device 120, software and data 410 includes image analysis program 200. With respect to server 130, software and data 410 includes document 134.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for analyzing an image, the method comprising:
    identifying, by one or more processors, a document that includes (i) at least one image and (ii) unstructured text that is situated proximate to the image, wherein both the image and the unstructured text are concurrently displayed in the document;
    identifying, by one or more processors, one or more potential locations depicted in the image included in the identified document, based on an analysis of the unstructured text that is situated proximate to the image;
    identifying, by one or more processors, a set of images of a first potential location from the identified one or more potential locations;
    responsive to determining that an image in the set of images of the first potential location substantially matches the image included in the identified document, determining, by one or more processors, that the location depicted in the image that substantially matches the image included in the identified document is the location depicted in the image included in the identified document;
    identifying, by one or more processors, an updated image that includes the location depicted in the image included in the identified document, wherein the updated image is associated with a date that is more recent than a date associated with the image included in the identified document; and
    initiating, by one or more processors, display of the identified updated image within the identified document.

2. The method of claim 1, wherein identifying the updated image that includes the location depicted in the image included in the identified document further comprises:
    responsive to determining that an image in the set of images of the first potential location substantially matches the image included in the identified document, identifying, by one or more processors, a set of tagged images that are tagged with metadata indicating location information that corresponds to metadata associated with the determined matching image in the set of images of the first potential location; and
    determining, by one or more processors, an updated image of the image included in the identified document from the identified set of tagged images, wherein the determined updated image is the image of the identified set of tagged images that includes metadata indicating a most recent date.

3. The method of claim 1, further comprising:
    responsive to determining that no image in the set of images of the first potential location substantially matches the image included in the identified document, identifying, by one or more processors, a set of images of a second potential location from the identified one or more potential locations; and
    determining, by one or more processors, whether an image in the set of images of the second potential location substantially matches the image included in the identified document.

4. The method of claim 1, wherein identifying a set of images of a first potential location of the identified one or more potential locations, comprises:
    determining, by one or more processors, a confidence value for at least one of the identified one or more potential locations that indicates a likelihood that a potential location is represented in the image included in the identified document, wherein the confidence values are derived from the unstructured text that is situated proximate to the image; and
    identifying, by one or more processors, the set of images of the first potential location of the identified one or more potential locations, wherein the first potential location is associated with highest determined confidence value.

5. The method of claim 1 wherein, the identified updated image is displayed as a thumbnail image in proximity to the image included in the identified document and in proximity to the unstructured text that is situated proximate to the image.

6. The method of claim 1, wherein determining whether an image in the set of images of the first potential location substantially matches the image included in the identified document, further comprises:
    removing, by one or more processors, objects from foreground of the image included in the identified document and objects from foreground of images of the identified set of images of the first potential location; and
    comparing, by one or more processors, the images of the identified set of images of the first potential location with their foreground objects removed to the image included in the identified document with its foreground objects removed.

7. The method of claim 1, wherein identifying one or more potential locations depicted in the image included in the identified document, based on an analysis of the unstructured text that is situated proximate to the image, further comprises:
analyzing, by one or more processors, the unstructured text that is situated proximate to the image to identify text in the identified document indicative of names of locations and a respective distance from the image to said text in the identified document indicative of the names of locations.

8. The method of claim 1, wherein the image included in the identified document is not tagged with metadata that indicates a location depicted in the image.

9. A computer program product for analyzing an image, the computer program product comprising:
one or more computer readable storage media and program instructions stored on the one or more computer readable storage media, the program instructions comprising:
program instructions to a document that includes (i) at least one image and (ii) unstructured text that is situated proximate to the image, wherein both the image and the unstructured text are concurrently displayed in the document;
program instructions to one or more potential locations depicted in the image included in the identified document, based on an analysis of the unstructured text that is situated proximate to the image;
program instructions to identify a set of images of a first potential location from the identified one or more potential locations;
responsive to determining that an image in the set of images of the first potential location substantially matches the image included in the identified document, program instructions to determine that the location depicted in the image that substantially matches the image included in the identified document is the location depicted in the image included in the identified document;
program instructions to identify an updated image that includes the location depicted in the image included in the identified document, wherein the updated image is associated with a date that is more recent than a date associated with the image included in the identified document; and
program instructions to initiate display of the identified updated image within the identified document.

10. The computer program product of claim 9, wherein identifying the updated image that includes the location depicted in the image included in the identified document further comprises:
responsive to determining that an image in the set of images of the first potential location substantially matches the image included in the identified document, identify a set of tagged images that are tagged with metadata indicating location information that corresponds to metadata associated with the determined matching image in the set of images of the first potential location; and
determine an updated image of the image included in the identified document from the identified set of tagged images, wherein the determined updated image is the image of the identified set of tagged images that includes metadata indicating a most recent date.

11. The computer program product of claim 9, further comprising program instructions, stored on the one or more computer readable storage media, to:
responsive to determining that no image in the set of images of the first potential location substantially matches the image included in the identified document, identify a set of images of a second potential location from the identified one or more potential locations; and
determine whether an image in the set of images of the second potential location substantially matches the image included in the identified document.

12. The computer program product of claim 9, wherein the program instructions to identify a set of images of a first potential location of the identified one or more potential locations, comprises program instructions to:
determine a confidence value for at least one of the identified one or more potential locations that indicates a likelihood that a potential location is represented in the image included in the identified document, wherein the confidence values are derived from the unstructured text that is situated proximate to the image; and
identify the set of images of the first potential location of the identified one or more potential locations, wherein the first potential location is associated with highest determined confidence value.

13. The computer program product of claim 9, wherein the identified updated image is displayed as a thumbnail image in proximity to the image included in the identified document and in proximity to the unstructured text that is situated proximate to the image.

14. The computer program product of claim 9, wherein the program instruction to determine whether an image in the set of images of the first potential location substantially matches the image included in the identified document, further comprise program instructions to:
remove objects from foreground of the image included in the identified document and objects from foreground of images of the identified set of images of the first potential location; and
compare the images of the identified set of images of the first potential location with their foreground objects removed to the image included in the identified document with its foreground objects removed.

15. The computer program product of claim 9, wherein the program instruction to identify one or more potential locations depicted in the image included in the identified document, based on an analysis of the unstructured text that is situated proximate to the image, further comprise program instructions to:
analyze the unstructured text that is situated proximate to the image to identify text in the identified document indicative of names of locations and a respective distance from the image to said text in the identified document indicative of the names of locations.

16. A computer system for analyzing an image, the computer system comprising:
one or more computer processors;
one or more computer readable storage media; and
program instructions stored on the computer readable storage media for execution by at least one of the one or more processors, the program instructions comprising:
program instructions to a document that includes (i) at least one image and (ii) unstructured text that is situated proximate to the image, wherein both the image and the unstructured text are concurrently displayed in the document;

program instructions to one or more potential locations depicted in the image included in the identified document, based on an analysis of the unstructured text that is situated proximate to the image;

program instructions to identify a set of images of a first potential location from the identified one or more potential locations;

responsive to determining that an image in the set of images of the first potential location substantially matches the image included in the identified document, program instructions to determine that the location depicted in the image that substantially matches the image included in the identified document is the location depicted in the image included in the identified document;

program instructions to identify an updated image that includes the location depicted in the image included in the identified document, wherein the updated image is associated with a date that is more recent than a date associated with the image included in the identified document; and program instructions to initiate display of the identified updated image within the identified document.

17. The computer system of claim 16, wherein identifying the updated image that includes the location depicted in the image included in the identified document further comprises responsive to determining that an image in the set of images of the first potential location substantially matches the image included in the identified document, identify a set of tagged images that are tagged with metadata indicating location information that corresponds to metadata associated with the determined matching image in the set of images of the first potential location; and determine an updated image of the image included in the identified document from the identified set of tagged images, wherein the determined updated image is the image of the identified set of tagged images that includes metadata indicating a most recent date.

18. The computer system of claim 16, further comprising program instructions, stored on the computer readable storage media for execution by at least one of the one or more processors, to:

responsive to determining that no image in the set of images of the first potential location substantially matches the image included in the identified document, identify a set of images of a second potential location from the identified one or more potential locations; and determine whether an image in the set of images of the second potential location substantially matches the image included in the identified document.

19. The computer system of claim 16, wherein the program instructions to identify a set of images of a first potential location of the identified one or more potential locations, comprises program instructions to:

determine a confidence value for at least one of the identified one or more potential locations that indicates a likelihood that a potential location is represented in the image included in the identified document, wherein the confidence values are derived from the unstructured text that is situated proximate to the image; and identify the set of images of the first potential location of the identified one or more potential locations, wherein the first potential location is associated with highest determined confidence value.

20. The computer system of claim 16, wherein the identified updated image is displayed as a thumbnail image in proximity to the image included in the identified document and in proximity to the unstructured text that is situated proximate to the image.

* * * * *